United States Patent [19]
Rawlins

[11] 3,777,047
[45] Dec. 4, 1973

[54] SPACER DAMPER
[75] Inventor: Charles B. Rawlins, Massena, N.Y.
[73] Assignee: Aluminum Company of America, Pittsburgh, Pa.
[22] Filed: Apr. 23, 1973
[21] Appl. No.: 353,650

[52] U.S. Cl. .................................. 174/42, 174/146
[51] Int. Cl. ......................... H02g 7/12, H02g 7/14
[58] Field of Search .................... 174/40 R, 42, 146

[56] References Cited
UNITED STATES PATENTS
3,443,019  5/1969  Walker et al. ...................... 174/42
3,582,983  6/1971  Claren ................................. 174/42

*Primary Examiner*—Laramie E. Askin
*Attorney*—Elroy Strickland

[57] ABSTRACT

A damping spacer for overhead, parallel conductors in which the groove axes of conductor receiving clamps are displaced from the axes of resilient wire cables respectively connecting the clamps to a spacer frame. In addition, the clamps and frame are loosely coupled together to limit cable and clamp movement with respect to the frame.

3 Claims, 1 Drawing Figure

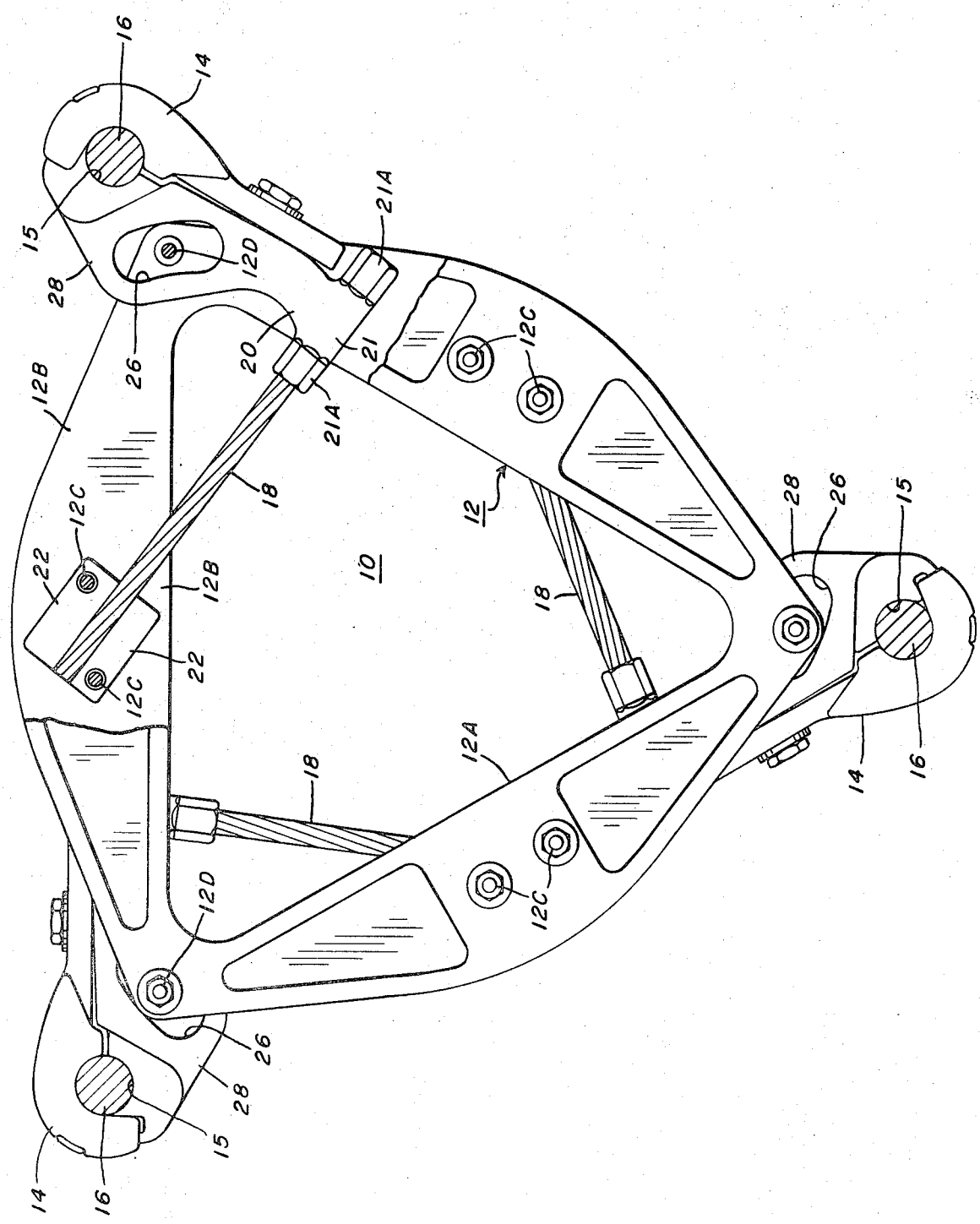

SPACER DAMPER

BACKGROUND OF THE INVENTION

The present invention relates generally to damping spacers for overhead, parallel electrical conductors, sometimes termed a conductor bundle, in which each conductor is called a subconductor, and more particularly to a spacer damper having improved damping characteristics over the spacer damper disclosed in U. S. Walker et al. U.S. Pat. 3,443,019.

In the Walker et al patent, electrical conductor clamps are connected to the extremities of a generally H or X-shaped spacer frame by essentially straight, resilient cables made of resilient wire strands. Each clamp has an integrally formed, elongated sleeve surrounding its associated wire cable, which sleeve extends rearwardly from the clamp into an elongated cavity or socket provided in the spacer frame to accommodate the sleeve and cable. The axes of the wire cable and sleeve are in line with and thus extend generally through the axis of the groove in the clamp for receiving an electrical conductor. With aeolian (vertical) vibrations of the conductor, the conductor clamp pivots on the axis of the wire cable to flex the same and thereby provide friction between the wire strands, the friction providing damping action through heat dissipation.

With the structure of the Walker et al patent, vibrations involving horizontal movements of the conductors, in which the clamp would endeavor to pivot in a horizontal plane normal to the axis of the cable and sleeve, cannot be damped to any significant degree since the cable sleeve is an integral part of the clamp and rigid along the length of the cable. Such a structure does not allow flexing of the cable except perhaps at the very end thereof adjacent the end wall of the spacer frame cavity.

In addition, it will be noted that the damping cables in the Walker et al. patent are protected against excessive compression forces acting thereon by the sleeve, i.e., with forces directed inwardly therealong the sleeve abuts against the frame at the end of the cavity accommodating the sleeve and resilient cable. The damping cables of the patent are not, however, protected from high tensile forces and stresses imposed thereon since such forces act directly upon the damping cable without means for restraining the same. With sufficient force and frequency of such tensile stressing the cable can eventually weaken and finally break, leaving the conductor originally secured by the broken cable free to move against the other parallel conductors.

BRIEF SUMMARY OF THE INVENTION

The present invention provides a damping spacer in which the damping cables function to dampen both horizontal and vertical movements and oscillations of clamped conductors while simultaneously protecting the damping cables from both tensile and compression forces imposed thereon by the clamped conductors. Briefly, this is accomplished by resiliently connecting each conductor clamp to a spacer frame by a multistrand wire cable extending in a direction generally perpendicular to the axis of the clamp so that the conductor held by the clamp is not in line with the axis of the wire cable. Further, each clamp is mechanically but loosely coupled or connected to the frame to allow each clamp free movement with respect to the frame within the limits of the loose couple. In this manner, when one or more of the conductors moves vertically or horizontally, or in planes therebetween, the multistrand cable connecting the conductor clamp to the frame is free to flex, and thereby provide damping action via interstrand friction, in the direction that accommodates the particular conductor movement, the only restraint imposed on cable movement being that of the means loosely coupling the clamp to the frame. When conductor motion is such that excessive compressive or tensile forces might otherwise be exerted on the damping cables, the conductor clamps move to engage the frame to thus transfer such forces directly to the frame. In this manner, the frame receives excessive compressive and tensile forces rather than the cables, thereby protecting the cables from such forces and thus increasing the life of the cables over prior constructions using damping cables.

In addition, if the frame has a generally circular or closed loop configuration, the degree of freedom of each clamp and conductor with respect to the other is enhanced since the clamps and damping cables will be located on the frame at various angles with respect to each other.

THE DRAWING

The invention, along with its objectives and advantages, will be better understood from consideration of the following detailed description when read in connection with the accompanying drawing in which the sole FIGURE is a side elevational view of the damping spacer of the invention.

PREFERRED EMBODIMENT

Referring now to the drawing, there is shown a damping spacer 10 of the invention in which a frame 12 supports a plurality of clamps 14 between two parallel, spaced apart frame plates 12A and 12B, the plates being spaced apart a distance to allow free movement of the clamps. The plates are secured together by suitable fastening means, such as the nuts and bolts shown in the drawing and generally indicated by numerals 12C and 12D, the bolts extending through and between the plates 12A and 12B, In the drawing, a portion of plate 12B is made visible by cutting away a portion of plate 12A.

The plurality of clamps 14 are adapted to clamp, in opposed, conductor receiving grooves 15 thereof, a corresponding plurality of parallel conductors 16, shown in cross section. For purposes of illustration, three conductor clamps in a three subconductor bundle arrangement are spaced by frame 12, frame 12 being depicted in the figure of the drawing as a closed loop, unitary structure having an outwardly rounded though somewhat triangular configuration. The invention, however, is not limited to such a configuration and number of clamps, it being applicable, for example to damping and spacing two, four or more parallel subconductors.

Each clamp 14 is resiliently attached to the frame 12 by an essentially straight, multistrand wire cable 18 lying between the frame plates 12A and 12B. In the figure, one of the wire cables and conductor clamp is made entirely visible by the above-mentioned cutaway portion of the frame plate facing the viewer. The wire cable is shown disposed at a substantially right angle to the axis of an arm portion 20 of the clamp, which portion also lies between the plates of the frame. The clamp end of each cable 18 may be secured within a bore (not visible in the drawing) provided in the cable end of the clamp arm 20 to provide a connection between the clamp arm and cable, as indicated generally by numeral 21, the securing of the cable end in the clamp bore being effected, for example, by opposed, annular bosses 21A squeezed upon the end of the cable.

The other end of the cable 18 may be secured to the frame 12, and between the frame plates 12A and 12B as shown in the figure, by two blocks 22 fastened to the frame by the bolts 12C, the blocks having cable engaging surfaces that tighten on the cable end when the bolts are tightened on the frame.

The strands of each cable 18 are made of resilient material, galvanized steel for example, and are wound together in a helical lay as shown in the drawing. The diameter, lay and strength of the resilient strands are such that with flexing of the cable caused by aeolian or horizontal oscillation of its associated conductor interwire friction occurs sufficient to dissipate, in the form of heat, the energy of such oscillations without fatigue and failure of the strands, and thus function to damp the oscillations of the conductor.

The axes of each wire cable 18 and clamp arm 20 are angularly disposed with respect to each other such that, in accordance with the invention, and for reasons presently to be explained, the axes of each conductor 16, and conductor receiving groove 15 of each clamp, are offset from and eccentrically located with respect to the axis of each cable 18.

In addition to being resiliently connected to the frame 12, the conductor clamps 14 are mechanically connected or coupled to the frame by the shanks of the bolts 12D extending between the frame plates 12A and 12B, and respectively through openings or slots 26 provided in the respective clamps.

The diameter or cross section of each bolt 12D is substantially smaller than the smallest dimension of the openings 26 such that the mechanical connection afforded by each bolt is loose, the looseness of the connection providing a freedom of movement of the associated clamp 14 and conductor 16 with respect to the frame 12. In addition, the opening 26 in each clamp is located in an enlarged portion 28 of the clamp at a location between the cable connection 21 and the conductor receiving groove 15 of the clamp. Such a clamp portion permits the opening 26 to be elongated along a line forming generally an acute angle with the axis of its associated resilient cable 18. Further, the openings may be slightly curved along its length dimension, as shown in the drawing.

In use, a plurality of the spacers 10 of the invention, as thus far described, are clamped to parallel conductors, such as 16, at spaced apart intervals along the length of the conductors between their supporting poles or towers. The frames 12 of the spacer-dampers, with the clamps 14, function to maintain the conductors in spaced relationship with the occurrence of any relative movements of the conductors. When the direction and energy of any air currents moving across the conductors are such that one or more of the conductors is caused to oscillate in a vertical or horizontal manner, the clamps 14 will tend to move with respect to the frame, between the frame plates, and in a plane parallel thereto. Because of the eccentricity of the cable and conductor axes, and since each damper cable 18 is an elongated, flexible member, it may flex in a manner to accommodate motions of the conductor clamps in any direction in the plane of the spacer frame 12.

Thus, the clamp end of the cable 18 may be displaced in the plane of the spacer and perpendicular to the cable axis, causing cable 18 to bow into an arc, allowing an associated displacement of conductor clamp 14. Or, the clamp end of cable 18 may be rotated without lateral displacement about an axis perpendicular to the plane of the spacer frame 12. This latter, rotational displacement also results in a translational displacement of the conductor clamp due to the eccentricity of conductor clamp from the cable 18. The conductor clamp displacements associated with displacement and rotation respectively of the clamp end of cable 18 are in different directions in the plane of spacer frame 12. Thus a combination of cable end displacement and rotation may always be found to accommodate a displacement of the conductor clamp 14 in any direction in the plane of the spacer frame 12.

Both translational and rotation displacement of the clamp end of the cable 18 cause flexure of cable 18, resulting in relative movement between the strands of the cable with associated interstrand friction and dissipation of energy. There is thus dissipation of vibration energy of the conductors for all directions of motion of the conductors perpendicular to their axes.

The damping of conductor vibration, as described above, takes place without the clamp 14 coming into contact with the shank of bolt 12D. However, under unusual load conditions not associated with the vibration to be damped, the bolt and clamp provides a motion limiting feature that protects the damping cables 18 from stresses that might otherwise destroy them. Such load conditions arise from ice formations on the conductors 16, and from short circuits involving momentarily large surges of current in the conductors. These ice loads and current surges move the conductors in a plane parallel to the spacer 10, i.e., in the same plane as conductor vibrations, and the conductor movement caused by current surges can be extremely violent.

In the present invention such loads and forces are received by the frame 12 instead of the cables 18 in the following manner. If the movement of a conductor 16 is such that the clamp is moved against the bolt 12D, the shank thereof serves as a fixed pin means to transfer the force of such movement to the frame, the clamp forming a lever when it engages the pin means, the pin means, in turn, serving as the fulcrum for the lever. As seen in the drawing, the location of the fulcrum (bolt 12D) is close to the conductor end of the clamp so that the forces that would otherwise be received by the associated cable, under unusual load conditions, are efficiently transferred to the frame, thereby protecting the cable from such forces. Movements of the conductor and clamp in planes other than that of the frame which would otherwise tend to overstress the cable are similarly transferred to the frame by the clamp abutting against bolt 12D or the frame plates 12A and 12B or both. It can be appreciated that if the conductors 16 were in line with the axes of their respective cables 18, i.e., with the longitudinal axes of the conductors passing through the axes of the cables, the cables would be subjected to compressive and tensile forces that might overstress the wire strands of the cable, and to a degree sufficient to cause their failure.

Because of the configuration of the frame 12, and because the conductors are offset from the cables, as provided by the configuration of the clamps and their attachment to the frame via their respective clamping cables, the freedom of conductor movement with respect to the frame, as discussed above, is made possible, with the result that damping action is made effective for both vertical and horizontal vibrations of the conductors. This is accomplished while simultaneously providing means to protect the damping cables from tensile and compressive forces that might otherwise tend to overstress the cables.

While the invention has been described in terms of preferred embodiments, the claims appended hereto are intended to encompass all embodiments which fall within the spirit of the invention.

Having thus described my invention and certain embodiments thereof, I claim:

1. A damping spacer for parallel, overhead conductors, the damping spacer comprising a frame, a plurality of spaced conductor clamps each having a groove for receiving one of said overhead conductors, and an arm portion connected to said frame, a flexible wire cable resiliently connecting each of said clamp arm portions to said frame at spaced locations thereon, the clamp arm portions and resilient cables providing a structure in which the axis of the conductor receiving groove of each conductor clamp is displaced from that of the wire cable associated therewith, and means loosely coupling together said frame and clamps to limit the movement of said wire cables and clamps with respect to the frame.

2. The structure of claim 1 wherein each of the clamps has an opening therein of a predetermined size and configuration, and means fixed to the frame extending through each of said openings, each of said means having a cross section smaller than the smallest dimension of said openings.

3. The structure of claim 1 in which the frame is unitary structure having a closed geometrical configuration.

* * * * *